US010371862B2

(12) United States Patent
Basu et al.

(10) Patent No.: US 10,371,862 B2
(45) Date of Patent: Aug. 6, 2019

(54) GEOMAGNETIC STORM WARNING

(71) Applicants: International Business Machines Corporation, Armonk, NY (US); HYDRO-QUÉBEC, Montréal (CA)

(72) Inventors: Chumki Basu, East Brunswick, NJ (US); Luc Cauchon, Saint-Basile-le-Grand (CA); Sébastien Guillon, Beaconsfield (CA); Innocent Kamwa, Longueuil (CA); Manikandan Padmanaban, Bangalore (IN)

(73) Assignees: INTERNATIONAL BUSINESS MACHINES CORPORATION, Armonk, NY (US); HYDRO-QUÉBEC (CA)

( * ) Notice: Subject to any disclaimer, the term of this patent is extended or adjusted under 35 U.S.C. 154(b) by 169 days.

(21) Appl. No.: 15/433,407

(22) Filed: Feb. 15, 2017

(65) Prior Publication Data

US 2018/0231686 A1 Aug. 16, 2018

(51) Int. Cl.
*G01W 1/10* (2006.01)
(52) U.S. Cl.
CPC ..................... *G01W 1/10* (2013.01)
(58) Field of Classification Search
CPC ........................................................ G01W 1/10
See application file for complete search history.

(56) References Cited

U.S. PATENT DOCUMENTS

| 5,673,366 A * | 9/1997 | Maynard ................ G01W 1/10 706/10 |
| 9,026,260 B1 | 5/2015 | Thornley et al. |
| 2016/0011241 A1 | 1/2016 | Phillips et al. |
| 2016/0069935 A1 | 3/2016 | Kreikebaum et al. |

OTHER PUBLICATIONS

Anonymously, "A System & Method for Predicting Future Spatial and TemporalOccurrence of Users based on their Past Spatio-Temporal Behavior," IP.com, IPCOM000245213D, Feb. 18, 2016, pp. 1-5.
Anonymously, "Method and apparatus for false leakage warning avoidance," IP.com, IPCOM000210132D, Aug. 26, 2011, pp. 1-7.
(Continued)

*Primary Examiner* — Manuel L Barbee
(74) *Attorney, Agent, or Firm* — Cantor Colburn LLP; Grant Johnson

(57) ABSTRACT

A method of receiving a substorm activity data log from one or more remote sensors, where substorm activity is due to solar activity. The method also includes receiving a harmonic distortion data stream from one or more remote observatories monitoring disturbances on a power grid, where the distortion is due to geomagnetically induced currents. The method also includes applying a mathematical model to the harmonic distortion data stream to create a derived harmonic distortion data log, and comparing phase-to-phase similarity of the three phases from the derived harmonic distortion data log. The method also includes predicting future adverse events due to geomagnetically-induced currents on the power grid based at least in part on the comparison and the substorm activity data log, and creating a warning based on the prediction.

20 Claims, 13 Drawing Sheets

(56) References Cited

OTHER PUBLICATIONS

C. Basu, et al., "Association RuleMining to Understand GMDs and their Effects on Power Systems," To appear in Proceedings of the IEEEPower & Energy Society General Meeting, Boston, MA, Jul. 2016, pp. 1-5.

C. Basu, et al., "Combining Multiple Sources of Information for Situational Awareness of Geomagnetic Disturbances," Proceedings of the IEEE Power &Energy Society General Meeting, Denver, CO, Jul. 2015, pp. 1-5.

Chumki Basu, "Determining Severity of a Geomagnetic Disturbance on a Power Grid Using Similarity Measures," U.S. Appl. No. 14/836,191, filed Aug. 26, 2015.

E. Cotilla-Sanchez, et al., "Predicting Critical Transitions FromTime Series Synchrophasor Data," IEEE Transactions on Smart Grid, vol. 3, No. 4, Dec. 2012. pp. 1-9.

L. Juusola, et al., "Earthward plasma sheet flows during substorm phases," Journal of Geophysical Research, vol. 116, A10228,doi:10.1029/2011JA016852, 2011, pp. 1-11.

N. Partamies, et al., "Statistical properties of substorms during different storm and solar cycle phases," Ann. Geophys., 31, pp. 349-358, 2013.

W. Oliveira, Jr., et al. "Comparing compression models for authorship attribution," Forensic Science International 228 (2013) pp. 100-104.

\* cited by examiner

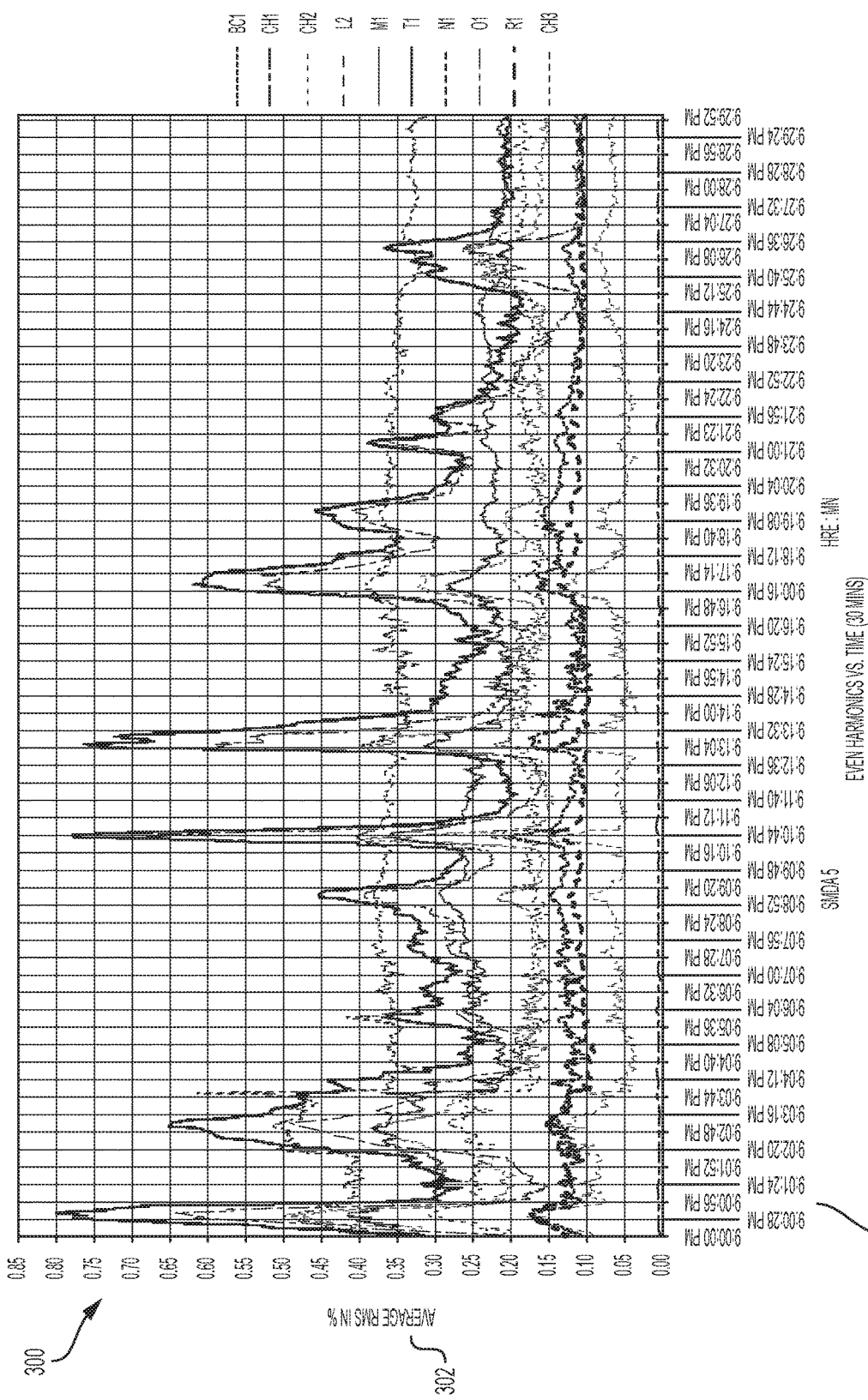

GEOMAGNETIC STORM WARNING

BACKGROUND

The present invention generally relates to predicting electromagnetic disturbance events. More specifically, the present invention relates to systems, methods, and computer program products for generating warnings of harmonic distortion events in an electrical power grid caused by solar eruptions originating from the Sun.

Solar eruptions, also called coronal mass ejections, solar wind, or substorms, can cause geomagnetic disturbances (GMDs) on earth. Solar eruptions are variable waves of charged particles that travel through space and interact with the earth's magnetic fields. Solar eruptions can generate geomagnetically-induced currents (GICs) on exposed overhead transmission lines. GICs can have a severe impact on the electrical power grid, including, for example, voltage distortion, transformer damage, and large-scale blackouts. Utility companies primarily rely on actual and forecasted values of magnetic activity (indices) to create warnings to attenuate the effects of solar eruptions.

SUMMARY

Embodiments of the invention are directed to a method for receiving a substorm activity data log from one or more remote sensors, where the substorm activity is due to solar activity. A harmonic distortion data stream is received from one or more remote observatories monitoring disturbances on a power grid, where the distortion is due to geomagnetically-induced currents. A mathematical model is applied to the harmonic distortion data stream to create a derived harmonic distortion data log. Phase-to-phase similarity of the three electrical power phases is computed from the derived harmonic distortion data log. Future adverse events are then predicted using geomagnetically-induced current-related solar activity on the power grid based at least in part on the phase-to-phase similarity and the substorm activity data log. A warning is then created based on the prediction.

Embodiments of the invention are also directed to a method of receiving a log of geomagnetic variation measurements from remote observatories and calculating a monthly geomagnetic variation reference value for each remote observatory. The difference between the geomagnetic variation reference value and the current geomagnetic variation measurements is calculated. Auroral magnetic activity indices are determined by superposing the differences from each observatory to determine an upper envelope and a lower envelope, where the auroral electrojet index is equal to the auroral upper envelope value minus the auroral lower envelope value. The auroral indices are then applied to generate a warning in response to substorm activity.

Embodiments of the invention are also directed to a system having a memory with computer readable instructions and a processor for executing the computer readable instructions. The computer readable instructions include receiving a substorm activity data log from one or more remote sensors, where the substorm activity is due to solar activity. A harmonic distortion data stream is received from one or more remote observatories monitoring disturbances on a power grid, where the distortion is due to geomagnetically-induced currents. A mathematical model is applied to the harmonic distortion data stream to create a derived harmonic distortion data log. Phase-to-phase similarity of the three electrical power phases is computed from the derived harmonic distortion data log. Future adverse events are then predicted using geomagnetically-induced current-related solar activity on the power grid based at least in part on the phase-to-phase similarity and the substorm activity data log. A warning is then created based on the prediction. The system also includes one or more remote observatories, where magnetometers are used to record adverse effects due to solar activity on a power grid, and one or more remote sensors.

BRIEF DESCRIPTION OF THE DRAWINGS

The subject matter of embodiments of the present invention are particularly pointed out and distinctly defined in the claims at the conclusion of the specification. The foregoing and other features and advantages are apparent from the following detailed description taken in conjunction with the accompanying drawings in which:

FIG. 4B depicts graphs of even harmonics of geomagnetically-induced currents on a power grid according to one or more embodiments of the present invention;

DETAILED DESCRIPTION

Figure 1:
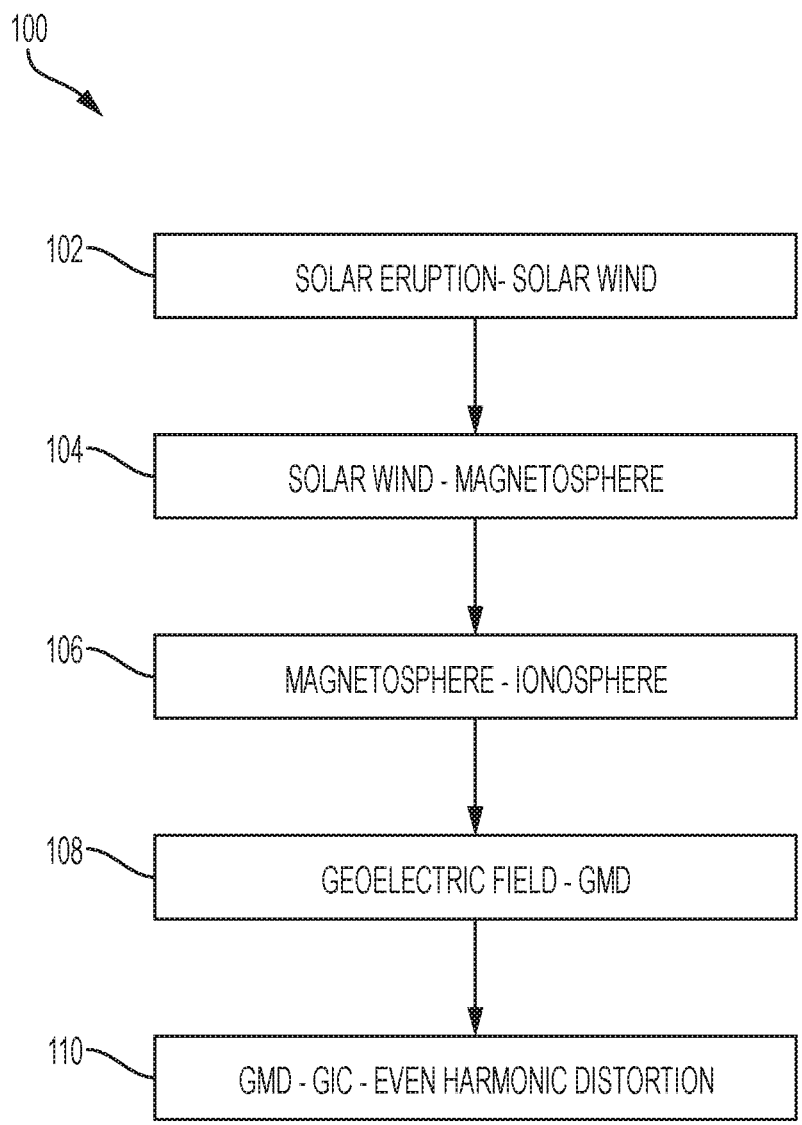
FIG. 1 depicts a flowchart displaying the formation of geomagnetically-induced currents according to embodiments of the present invention.

Various embodiments of the present invention are described herein with reference to the related drawings. Alternative embodiments can be devised without departing from the scope of this invention. It is noted that various connections and positional relationships (e.g., over, below, adjacent, etc.) are set forth between elements in the following description and in the drawings. These connections and/or positional relationships, unless specified otherwise, can be direct or indirect, and embodiments of the present invention are not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance, or illustration." Any embodiment or design described herein as "exemplary" is not necessarily to be construed as preferred or advantageous over other embodiments or designs. The term "one or more" is understood to include any integer number greater than or equal to one, i.e. one, two, three, four, etc. The term "a plurality" is understood to include any integer number greater than or equal to two, i.e. two, three, four, five, etc. The term "connection" can include an indirect "connection" and a direct "connection".

References in the specification to "one embodiment," "an embodiment," "an example embodiment," etc., indicate that the embodiment described can include a particular feature, structure, or characteristic, but every embodiment can include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top," "positioned on" or "positioned atop" mean that a first element, such as a first structure, is present on a second element, such as a second structure, where intervening elements such as an interface structure can be present between the first element and the second element. The term "direct contact" means that a first element, such as a first structure, and a second element, such as a second structure are connected without any intermediary conducting or insulating layers at the interface of the two elements.

Turning now to an overview of aspects of the present invention, disclosed herein are systems, methods, and computer program products to predict upcoming adverse effects to the power grid due to solar eruptions in order to plan around the effects and maintain a functioning power grid. Current forecasting techniques, however, are limited in that solar eruptions don't always cause GICs, and GICs don't always result in adverse impacts to the power grid. False warnings of impending GIC events leads to unnecessary costs, delays, and loss of service by shutting down sections of the power grid (i.e. brownouts and blackouts) for no effect. Existing detection techniques do not correlate with power grid activity completely, as magnetic indices alone are not very accurate at predicting power grid effects. Also, the time it takes current techniques to generate a warning (e.g., 2-3 hours) is often too late to take meaningful remedial steps. The present invention overcomes these limitations by predicting adverse effects due to GICs. The prediction is based at least in part on the use of even harmonic distortion (EHD) values. The prediction includes an estimate categorizing the effects as low, medium, or high severity, and also a warning for observers in order to minimize the effects of disruptions on a power grid.

Embodiments of the present invention include classification methods for predicting EHD due to GICs with a given lead time using a set of parameters. The set of parameters includes, but is not limited to, AE, AU, and AL values. The method also includes applying phase-to-phase similarity on harmonics event data for the power grid to label EHD events caused by GICs. The method also includes computing "phase-or-measurement unit" (PMU) level warnings of EHD events according to lead times from projected power grid effects. Creating warnings based on EHD values offers advantages over conventional processes. Mathematically, it is easier to determine the duration and intensity of a GIC event using EHD data over other derived data. Also, the methods disclosed herein show a strong correlation between substorm activity and EHD on the power grid. The method also includes transforming a stream of raw and derived measurements from remote sensors and observatories to infer substorm and electrojet properties, and to convert the measurements into a stream of symbols for further processing. The method also includes determining substorm growth, expansion, and recovery phases from the AL index values and the z-component of the interplanetary magnetic field (e.g. the solar wind). A more precise regional AE/AL index is also used as a derived measurement for substorm pattern matching. The method also includes analyzing the slope of variance of regional AL and regional AE values as a sign of a critical transition to detect the start of a substorm pattern. The method also includes applying compression techniques to sequences of symbols to infer classes of substorms, including EHD/non-EHD classes. The method also includes comparing a new substorm pattern against existing substorm patterns using both compression algorithms and compression ratio techniques. The method also includes computing substorm phases from the regional AE index which leads to improved results for compression-based classification. The method also includes defining a classifier that sets a threshold AE index value and uses that threshold to detect whether an impact on the power grid is high, and generates a warning.

Turning now to a detailed description of the present invention, embodiments of which are described in detail below by referring to the accompanying drawings in FIGS. 1-10. FIG. 1 shows a flowchart 100 displaying the formation of GICs according to embodiments of the present invention. Flowchart 100 includes block 102 with the Sun ejecting a mass of solar material in a solar eruption. The solar eruption creates a solar wind or flow of plasma into space that travels outwards from the Sun. In block 104, the solar wind travels from the Sun, portions of which eventually impact the Earth's magnetosphere. In block 106, the solar wind interacts with the Earth's magnetosphere forming random and/or complex electrical currents in the Earth's ionosphere. In block 108 the electrical currents in the ionosphere GMDs and induces a geoelectric field across regions in the upper atmosphere. In block 110, the GMDs induces GICs that often leads to severe impacts on the power grid due to the presence of EHD and other unwanted disturbances.

Figure 2:
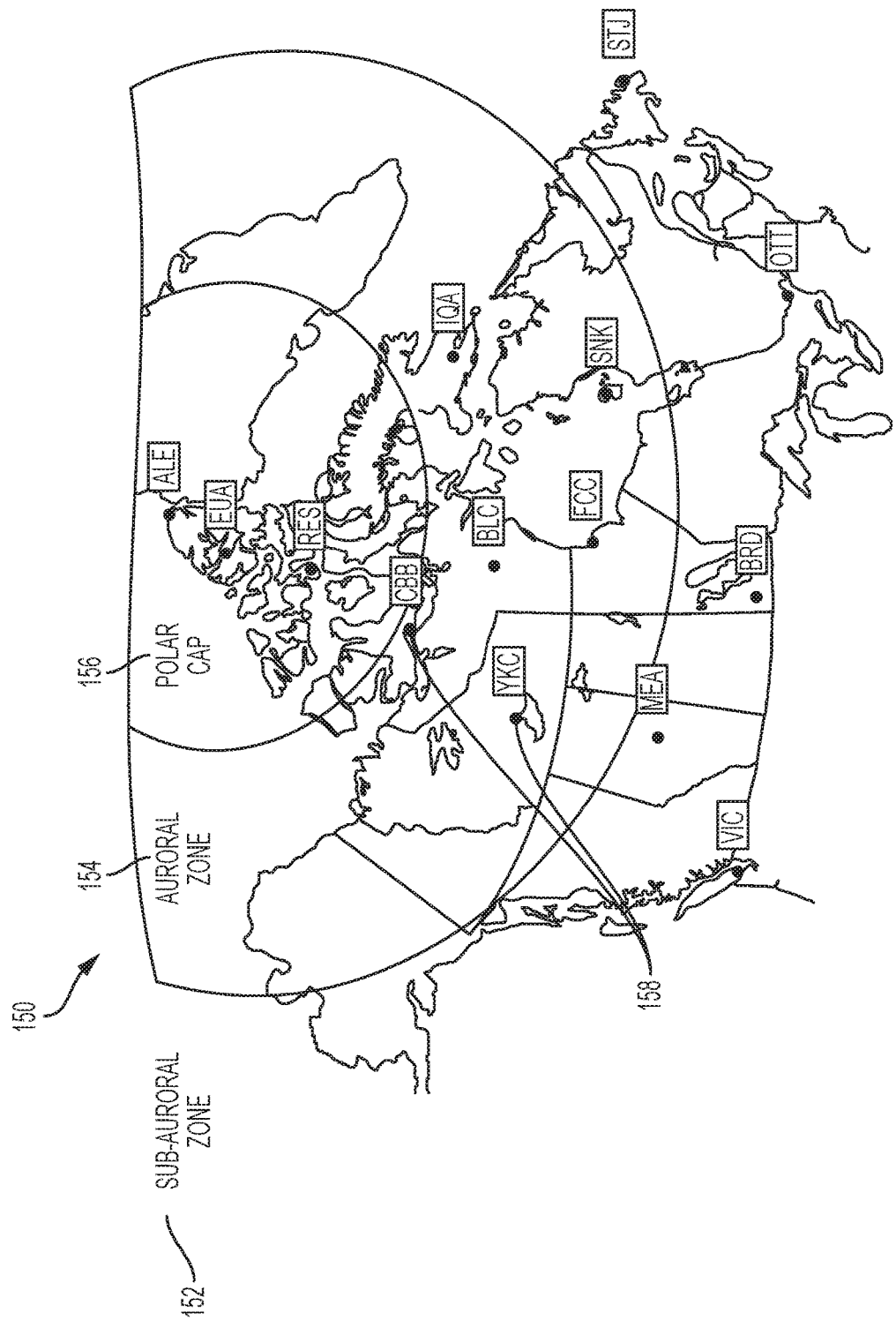
FIG. 2 depicts a map of regional observatories according to one or more embodiments of the present invention.

FIG. 2 depicts a map 150 showing regional observatories according to one or more embodiments of the present invention. The map 150, showing Canada as one example, includes several arbitrary geographic zones or regions of the Earth including a sub-auroral zone 152, an auroral zone 154, a polar cap zone 156, and one or more remote observatories 158 located within one or more of the regions. Several instruments are capable of detecting and recording GMDs and include remote sensors on orbiting satellites (not shown) and ground-based magnetometers located at the remote observatories 158. These sensors and observatories 158 capture and record phenomena occurring over time and therefore can record different lead times for possible effects on the Earth, as evidenced by adverse effects on the power grid. The remote observatories 158 can be manned or unmanned, can be at multiple locations, can be part of a laboratory such as a weather station, or can be affiliated with a university and/or a private company. The remote observatories 158 submit the recordings of GMDs and GICs to a central collection point via a computer network or other communications path for further processing and analysis.

Figure 3:
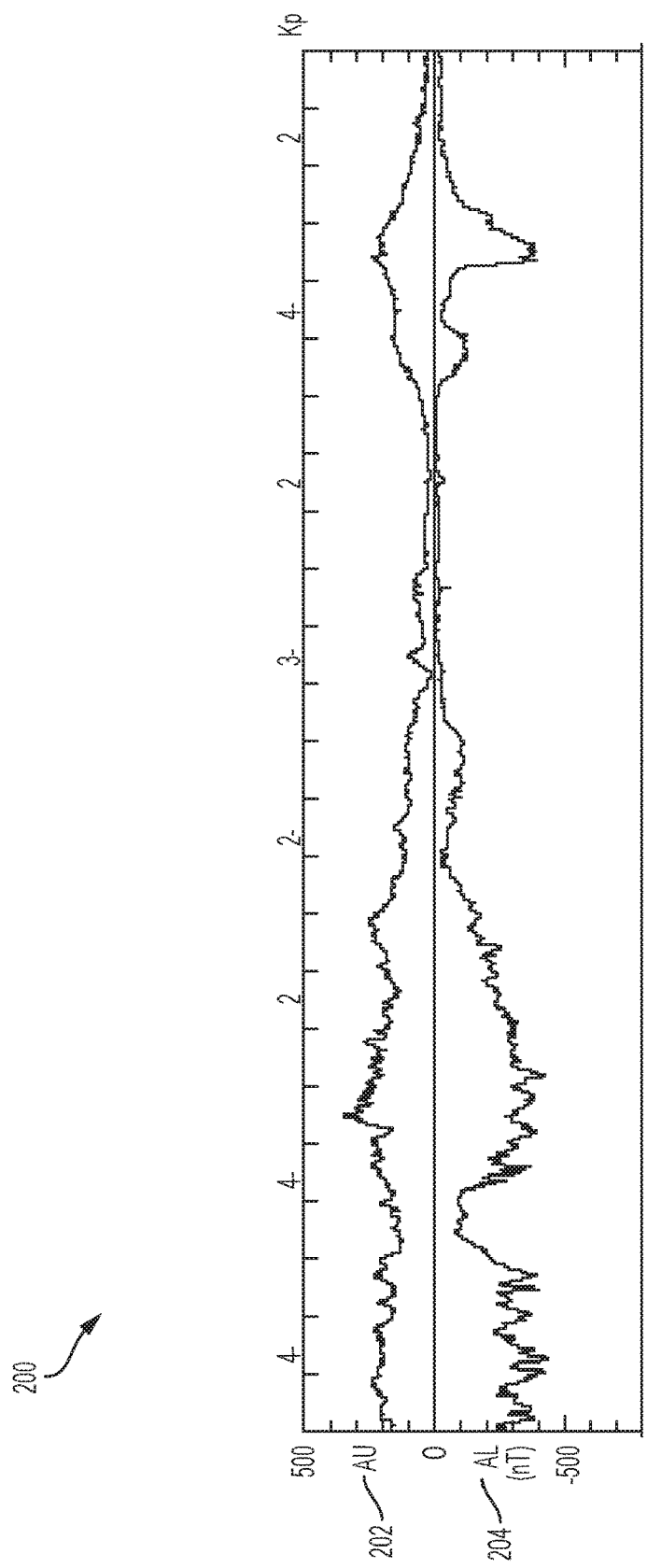
FIG. 3 depicts graphs of amplitude upper (AU) and amplitude lower (AL) indices derived from magnetometer measurements according to one or more embodiments of the present invention.

FIG. 3 depicts graphs of AU and AL indices 200 derived at least in part from magnetometer measurements according to one or more embodiments of the present invention. A substorm activity data log includes time- and/or frequency-based records of AE, AL, and AU magnetic activity indices, where the indices are used to describe disturbances received by the remote observatories. Graphs 200 include an AU indices graph 202 and an AL indices graph 204. The graphs 202, 204 are plotted in units of nanoteslas (nT), a measure of magnetic strength, versus a $K_p$ index. The $K_p$ index is a variation of a K-index that summarizes the global level of geomagnetic activity for a given time period on a planetary scale. The K-index quantifies disturbances in the horizontal component of the Earth's magnetic field with an integer value in the range 0-9 with 1 being calm and 5 or more indicating a geomagnetic storm. An AE value is defined as AE=(AU−AL). The graphs 202, 204 displays the AU and AL indices (202, 204 respectfully) that are derived at least in part from ground magnetometer measurements by superimposing magnetograms from a plurality of remote observatories around the world. Likewise, the AE index can be derived at least in part from the AU and AL indexes. However, the indices are imprecise when making predictions about what will happen at a specific geographic region. The same is also true when using planetary indices such as $K_p$ for forecasting. Whereas there are regional planetary magnetic indices such as $K_r$ (Canada), no such regional equivalent exists for AE/AU/AL indices.

Figure 4A:
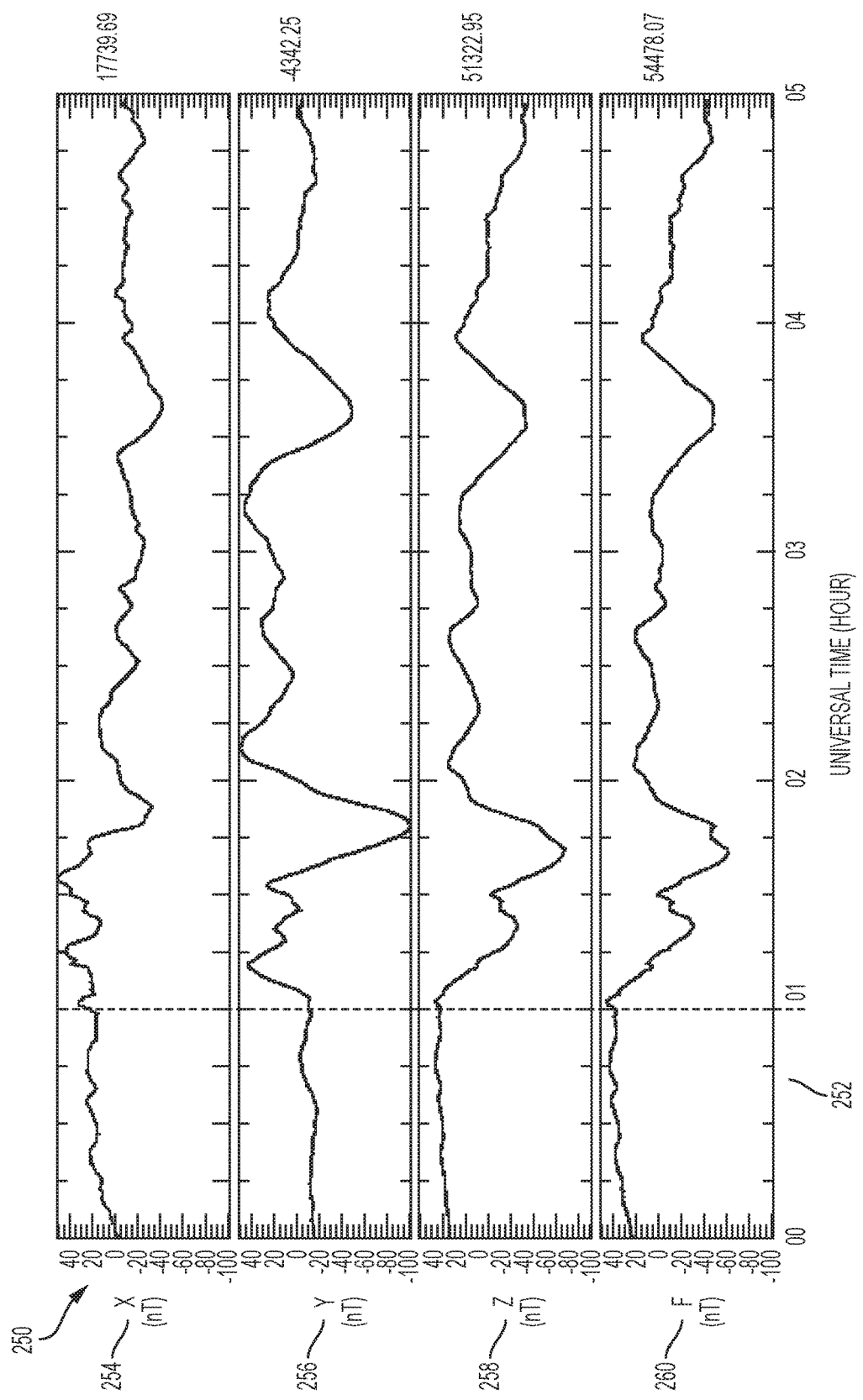
FIG. 4A depicts graphs of raw measurements of the magnetic B-field according to one or more embodiments of the present invention.

FIG. 4A depicts graphs of raw measurements of the magnetic B-field 250 according to one or more embodiments of the present invention. Graph 250 includes the B-field X-component "X" 254, the B-field Y-component "Y" 256, the B-field Z-component "Z" 258, and the resultant magnetic force "F" 260, all measured in units of nT as plotted over time on the x-axis 252. These values, also known as raw measurements, are compared to grid impact graphs in order to generate warnings of impeding adverse effects, including EHD events that could cause disruptions to the power grid.

FIG. 4B depicts graphs of even harmonics of geomagnetically-induced currents 300 as measured on a power grid according to one or more embodiments of the present invention. Graphs 300 displays average RMS voltage values of even harmonics 302 plotted over time on the x-axis 304 for a variety of locations.

Figure 4C:
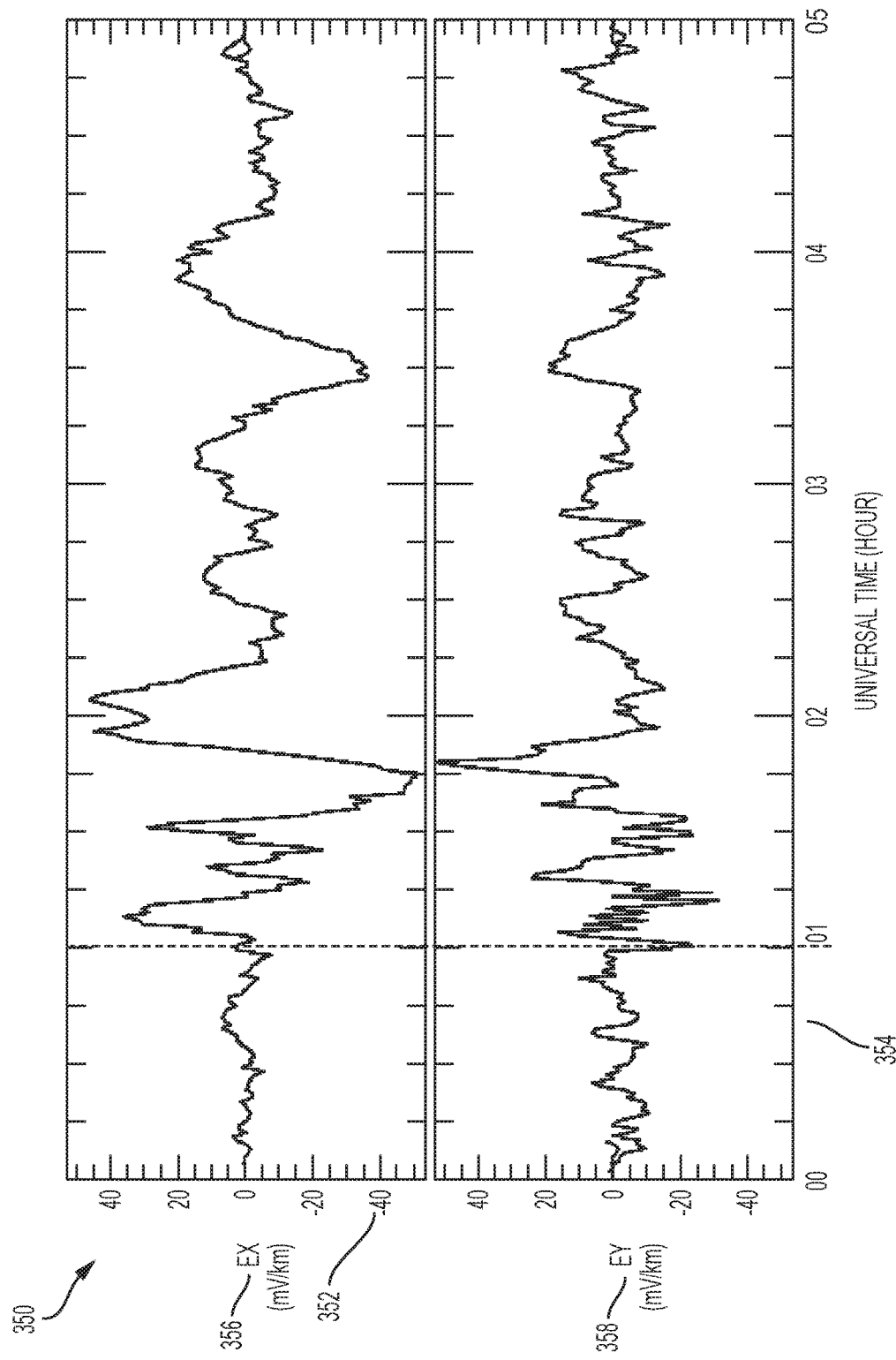
FIG. 4C depicts graphs of raw calculations based on measurements of the electric E-field according to one or more embodiments of the present invention.

FIG. 4C depicts graphs of raw calculations based on measurements of the electric E-field 350 according to one or more embodiments of the present invention. Graph 350 includes magnitudes of both the X- and Y-components 356, 358 respectfully of the E-field plotted over time on the x-axis 354.

Figure 4D:
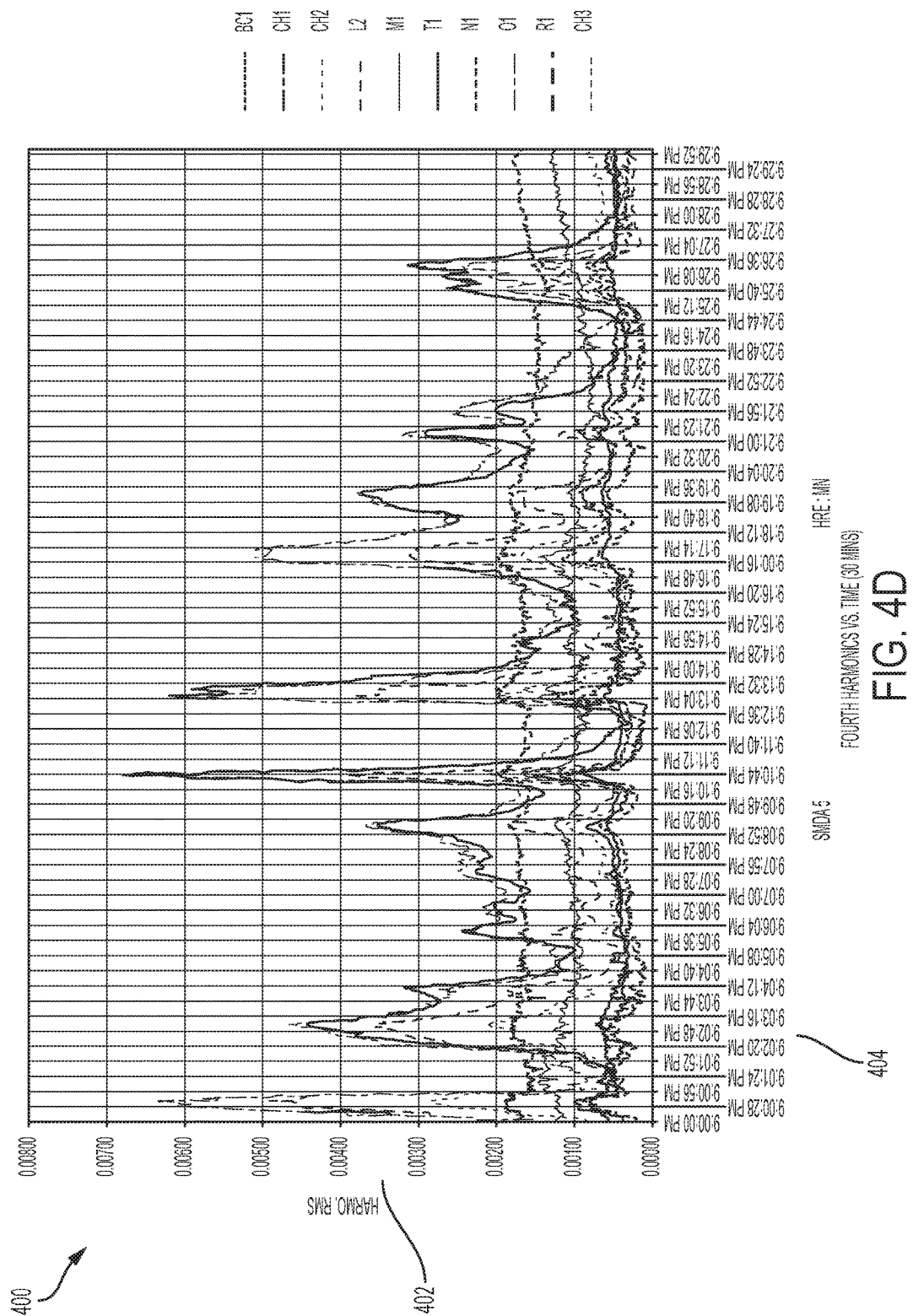
FIG. 4D depicts graphs of fourth harmonics of geomagnetically-induced currents on a power grid according to one or more embodiments of the present invention.

FIG. 4D depicts graphs of fourth harmonics of geomagnetically-induced currents 400 on a power grid according to one or more embodiments of the present invention. Graphs 400 plots the RMS voltage magnitude of fourth order harmonics 402 over time on the x-axis 404. In at least one embodiment, the processes and methods disclosed herein use data from GMD events, specifically the second harmonics. However, other data streams can provide useful information, including odd harmonic data or higher-order harmonic data, including fourth harmonic data as displayed here.

Figure 5:
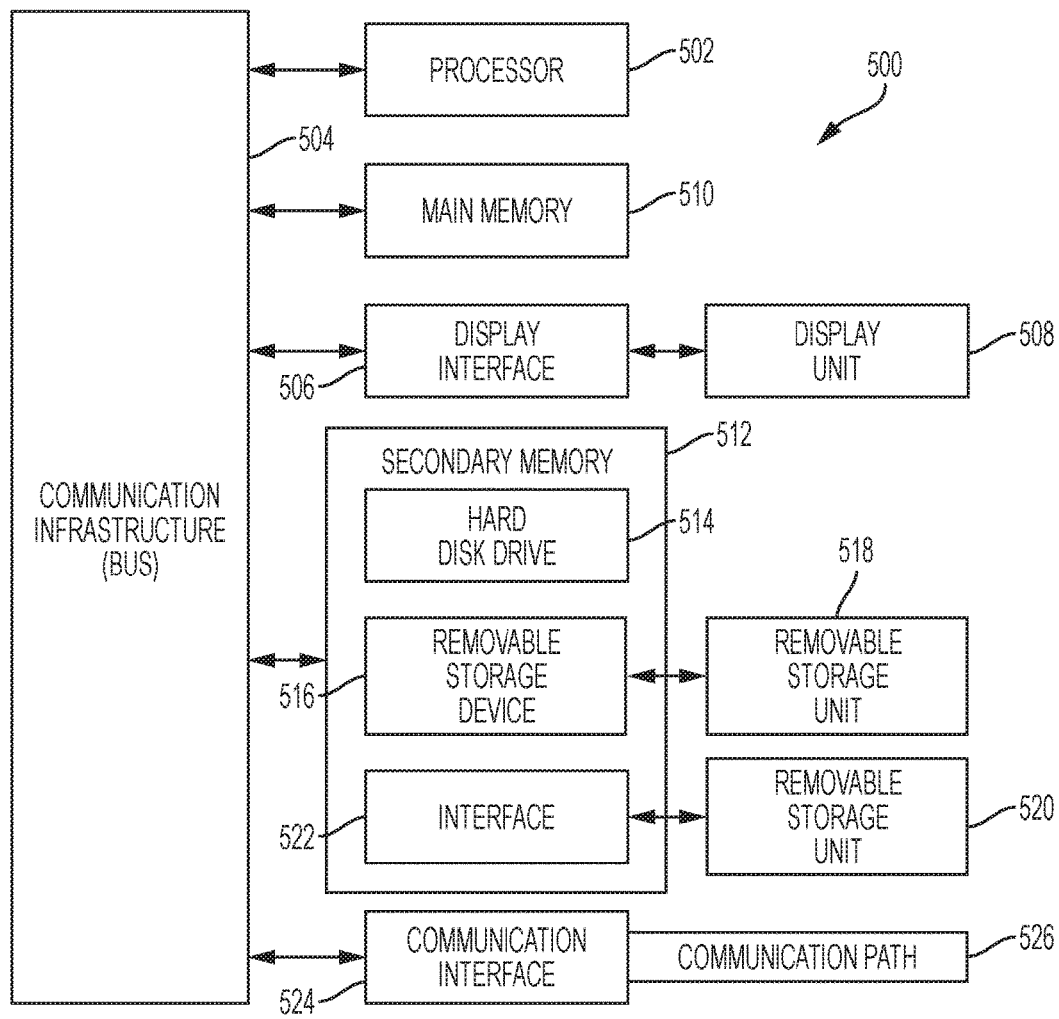
FIG. 5 depicts a high-level block diagram of a computer system according to one or more embodiments of the present invention.

FIG. 5 depicts a high-level block diagram of a computer system 500, which can be used to implement one or more embodiments. More specifically, computer system 500 can be used to implement hardware components of systems capable of performing methods described herein. Although one exemplary computer system 500 is shown, computer system 500 includes a communication path 526, which connects computer system 500 to additional systems (not depicted) and can include one or more wide area networks (WANs) and/or local area networks (LANs) such as the Internet, intranet(s), and/or wireless communication network(s). Computer system 500 and additional systems are in communication via communication path 526, e.g., to communicate data between them.

Computer system 500 includes one or more processors, such as processor 502. Processor 502 is connected to a communication infrastructure 504 (e.g., a communications bus, cross-over bar, or network). Computer system 500 can include a display interface 506 that forwards graphics, textual content, and other data from communication infrastructure 504 (or from a frame buffer not shown) for display on a display unit 508. Computer system 500 also includes a main memory 510, preferably random access memory (RAM), and can also include a secondary memory 512. Secondary memory 512 can include, for example, a hard disk drive 514 and/or a removable storage drive 516, representing, for example, a floppy disk drive, a magnetic tape drive, or an optical disc drive. Hard disk drive 514 can be in the form of a solid state drive (SSD), a traditional magnetic disk drive, or a hybrid of the two. There also can be more than one hard disk drive 514 contained within secondary memory 512. Removable storage drive 516 reads from and/or writes to a removable storage unit 518 in a manner well known to those having ordinary skill in the art. Removable storage unit 518 represents, for example, a floppy disk, a compact disc, a magnetic tape, or an optical disc, etc. which is read by and written to by removable storage drive 516. As will be appreciated, removable storage unit 518 includes a computer-readable medium having stored therein computer software and/or data.

In alternative embodiments, secondary memory 512 can include other similar means for allowing computer programs or other instructions to be loaded into the computer system. Such means can include, for example, a removable storage unit 520 and an interface 522. Examples of such means can include a program package and package interface (such as that found in video game devices), a removable memory chip (such as an EPROM, secure digital card (SD card), compact flash card (CF card), universal serial bus (USB) memory, or PROM) and associated socket, and other removable storage units 520 and interfaces 522 which allow software and data to be transferred from the removable storage unit 520 to computer system 500.

Computer system 500 can also include a communications interface 524. Communications interface 524 allows software and data to be transferred between the computer system and external devices. Examples of communications interface 524 can include a modem, a network interface (such as an Ethernet card), a communications port, or a PC card slot and card, a universal serial bus port (USB), and the like. Software and data transferred via communications interface 524 are in the form of signals that can be, for example, electronic, electromagnetic, optical, or other signals capable of being received by communications interface 524. These signals are provided to communications interface 524 via communication path (i.e., channel) 526. Communication path 526 carries signals and can be implemented using wire or cable, fiber optics, a phone line, a cellular phone link, an RF link, and/or other communications channels.

In the present description, the terms "computer program medium," "computer usable medium," and "computer-readable medium" are used to refer to media such as main memory 510 and secondary memory 512, removable storage drive 516, and a hard disk installed in hard disk drive 514. Computer programs (also called computer control logic) are stored in main memory 510 and/or secondary memory 512. Computer programs also can be received via communications interface 524. Such computer programs, when run, enable the computer system to perform the features discussed herein. In particular, the computer programs, when run, enable processor 502 to perform the features of the computer system. Accordingly, such computer programs represent controllers of the computer system. Thus it can be seen from the forgoing detailed description that one or more embodiments provide technical benefits and advantages.

Figure 6:
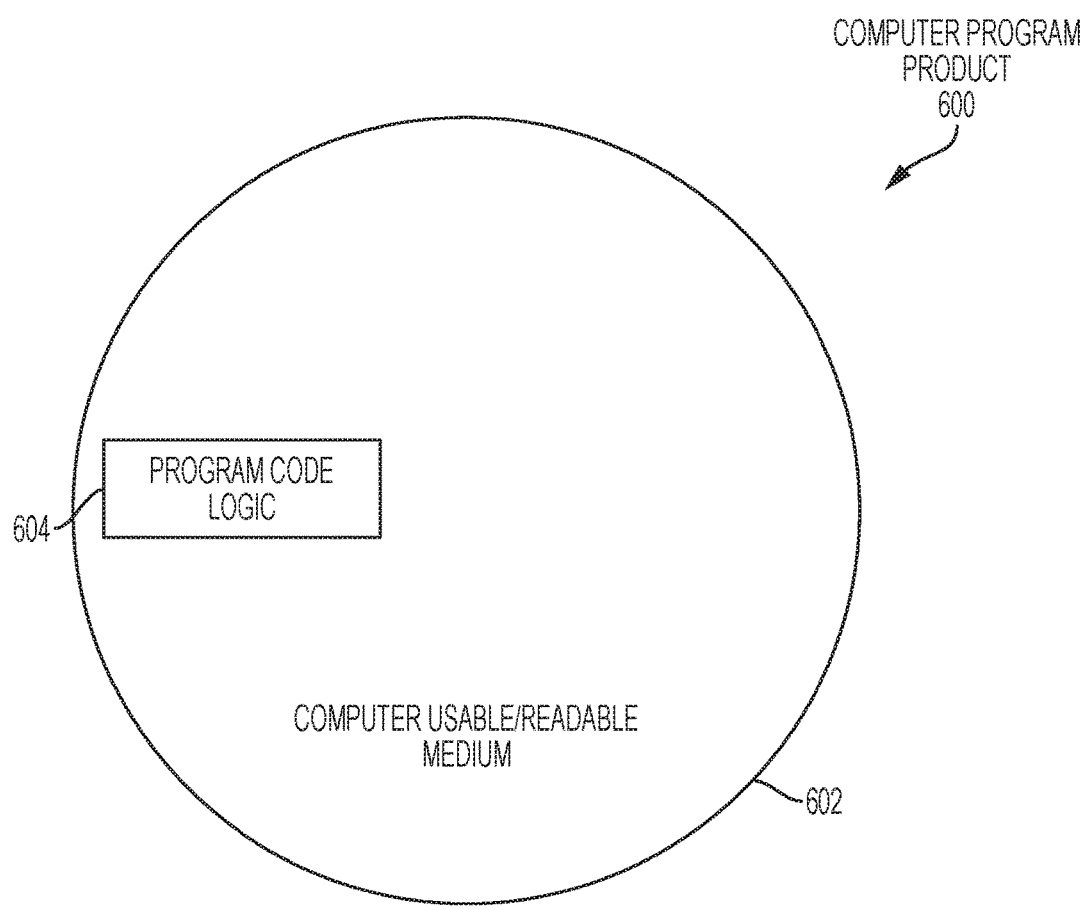
FIG. 6 depicts a computer program product that includes a computer-readable storage medium and program instructions according to one or more embodiments of the present invention.

Referring now to FIG. 6, a computer program product 600 in accordance with an embodiment that includes a computer-readable storage medium 602 and program instructions 604 is generally shown.

Embodiments can be a system, a method, and/or a computer program product. The computer program product can include a computer-readable storage medium (or media) having computer-readable program instructions thereon for causing a processor to carry out aspects of embodiments of the present invention.

The computer-readable storage medium can be a tangible device that can retain and store instructions for use by an instruction execution device. The computer-readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out embodiments can include assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer-readable program instructions can execute entirely on the operator's computer, partly on the operator's computer, as a stand-alone software package, partly on the operator's computer and partly on a remote computer or entirely on the remote computer or server. In the latter scenario, the remote computer can be connected to the operator's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer-readable program instructions by utilizing state information of the computer-readable program instructions to personalize the electronic circuitry, in order to perform embodiments of the present invention.

Aspects of various embodiments are described herein with reference to flowchart illustrations and/or block diagrams of methods, apparatus (systems), and computer program products according to various embodiments. It will be understood that each block of the flowchart illustrations and/or block diagrams, and combinations of blocks in the flowchart illustrations and/or block diagrams, can be implemented by computer-readable program instructions.

These computer-readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions can also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The descriptions presented herein are for purposes of illustration and description, but is not intended to be exhaustive or limited. Many modifications and variations will be apparent to those of ordinary skill in the art without departing from the scope and spirit of embodiments of the invention. The embodiment was chosen and described in order to best explain the principles of operation and the practical application, and to enable others of ordinary skill in the art to understand embodiments of the present invention for various embodiments with various modifications as are suited to the particular use contemplated.

Figure 7:
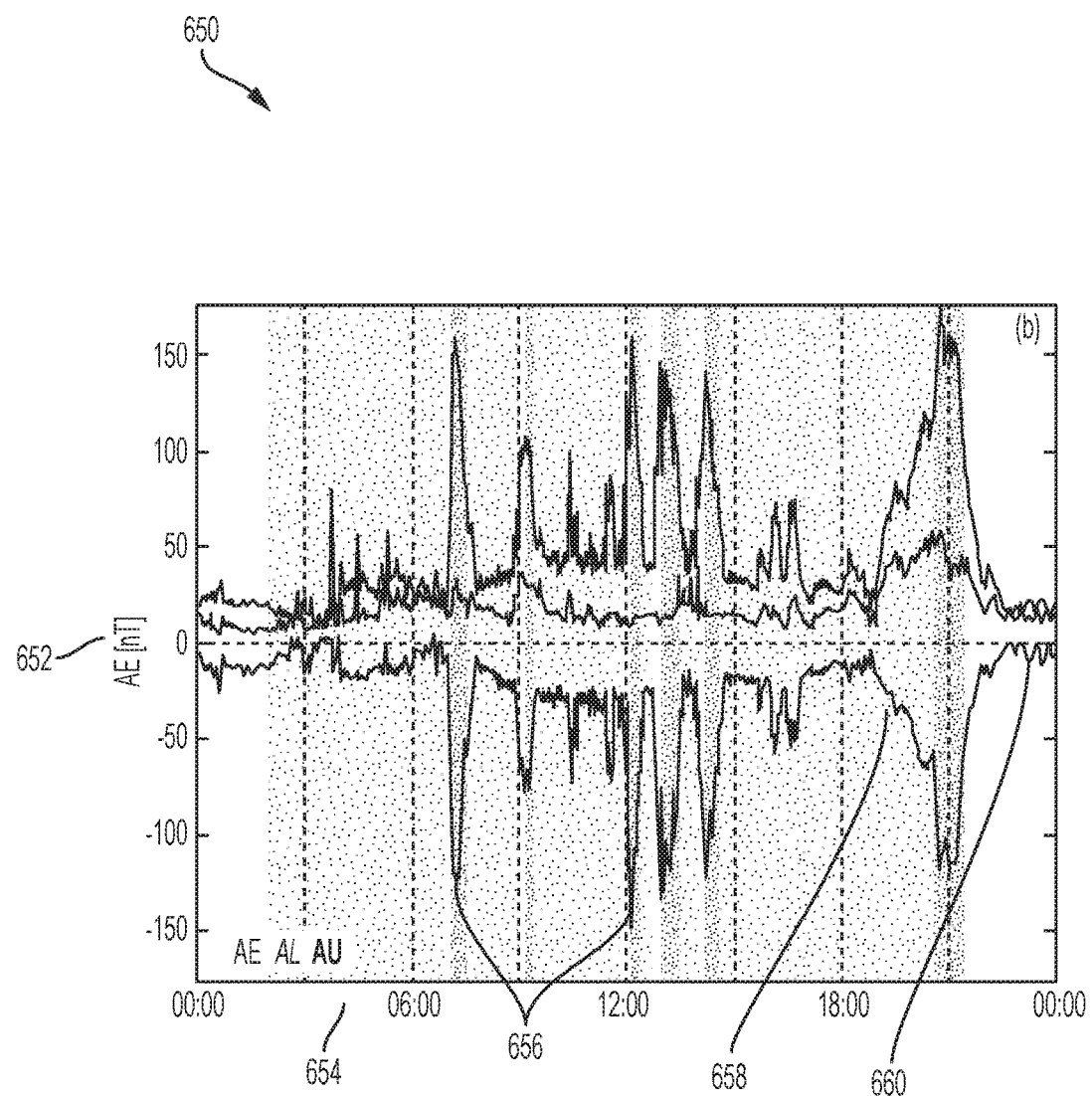
FIG. 7 depicts graphs of auroral envelope (AE), AU, and AL indices showing substorm growth, expansion, and recovery over time according to one or more embodiments of the present invention.

FIG. 7 depicts graphs of AE indices 650 showing substorm growth, expansion, and recovery phases over time according to one or more embodiments of the present invention. Graphs 650 are based in part on parameters including AE values, which are measured in nT, on the vertical axis 652. Graphs 650 shows time plotted on the horizontal axis 654, a substorm growth phase 656 where the substorm intensity is intensifying, an expansion phase 658, and a recovery phase 660 where substorm activity enters recovery. Placing graphs 656, 658, and 660 together on the same chart and aligning their time scales is one method to distinguish regularities in the graphs that are not visible from raw measurements alone.

Figure 8:
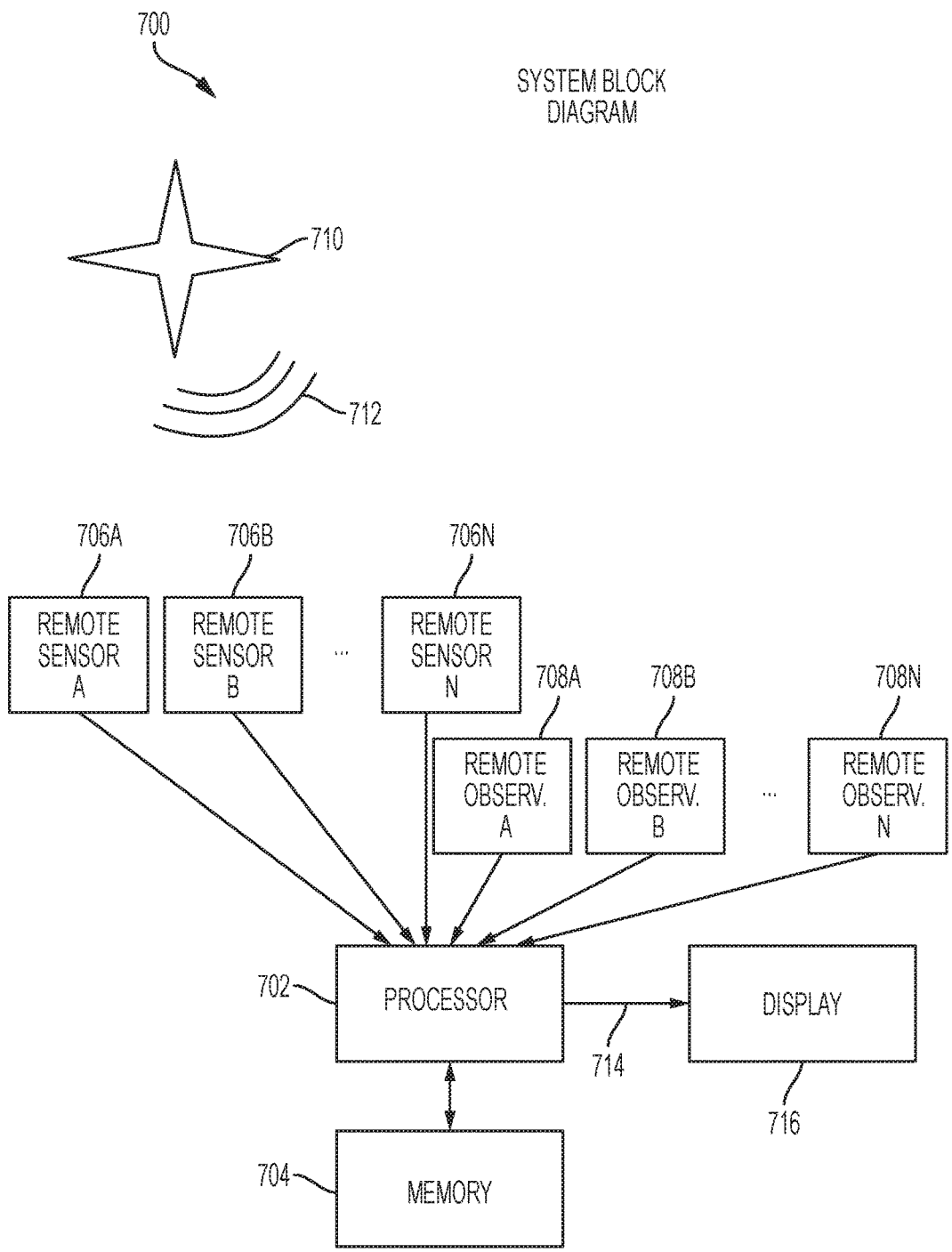
FIG. 8 depicts a block diagram of a system for detecting and recording substorm activity as it affects a power grid according to one or more embodiments of the present invention.

FIG. 8 depicts a block diagram of a system for detecting and recording substorm activity 700 as it affects a power grid. System 700 includes a processor 702, a memory unit 704, a display 716, one or more remote sensors 706A-706N, one or more remote observatories 708A-708N, a source of solar wind (the Sun) 710, solar wind 712 flowing from the Sun 710 to the Earth, and an communication link 714 between the processor 702 and the display 716. The Sun 710 produces the solar wind 712 during a solar eruption as shown in FIG. 1. The solar wind 712 is detected by one or more remote sensors 706A-706N. The remote sensors can be, but are not limited to one or more space-based artificial satellites orbiting around the Earth or the Sun 710. In a similar manner, GMD effects caused by the solar wind 712 are detected and measured by one or more terrestrially-based remote observatories 708A-708N. Data from the remote sensors 706A-706N and the remote observatories 708A-708N are sent to the processor 702 for analysis. The processor 702 works in conjunction with memory 704 to analyze data and generate a warning of predicted adverse effects due to solar wind. The warning is sent to the display 716 via the communications link 714. The processor 702 and memory is shown in further detail in FIGS. 5 and 6.

Figure 9:
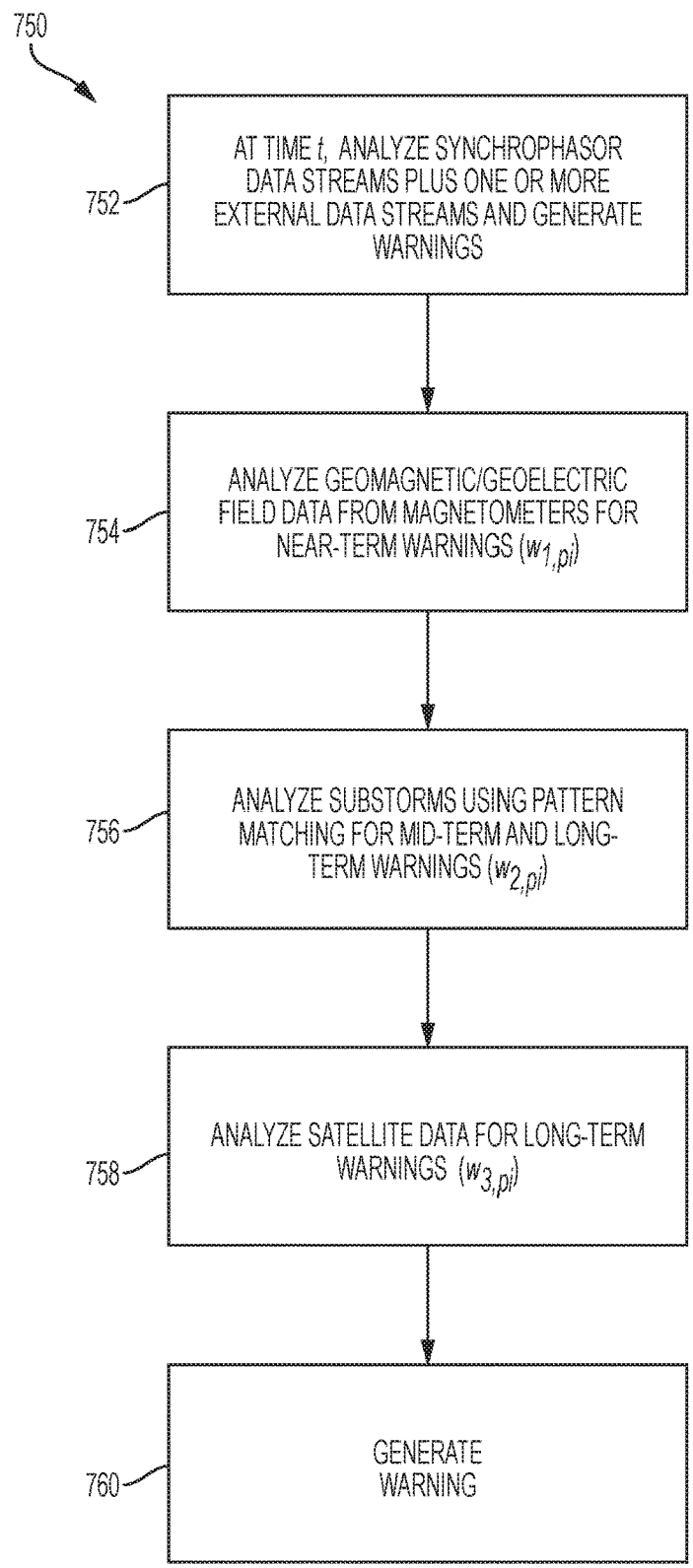
FIG. 9 depicts a flowchart of generating warnings using remote sensor and observation data streams according to one or more embodiments of the present invention.

FIG. 9 depicts a flowchart of a method to generating warnings 750 using remote sensor and observation data streams according to one or more embodiments of the present invention. Flowchart 750 includes block 752, where at time t a synchrophasor data stream plus one or more external data streams are analyzed to generate a PMU-level warning. At block 754, the method continues with analyzing the geomagnetic/geoelectric field data that were collected from magnetometers to generate near-term warnings ($w_{1,pi}$). The method continues at block 756 with analyzing substorms using, at least in part, magnetometer and satellite data using pattern matching techniques to generate mid-term and long-term warnings ($w_{2,pi}$). The method continues at block 758 by analyzing satellite data for long-term warnings ($w_{3,pi}$). By using these methods, a correlation has been found between magnetometer variables (as an example dBh/dt) and E-field magnitude and EHD events, which are caused by GICs. These variables are used to generate near-term warnings. Additionally, some satellite variables including, but not limited to solar wind bulk speeds are more relevant than others such as solar wind proton density with respect to EHD caused by GICs. Based on the methods described herein, long-term warnings can also be created. A more detailed description of using a compression model to form a warning is shown in further detail in FIG. 10.

Figure 10:
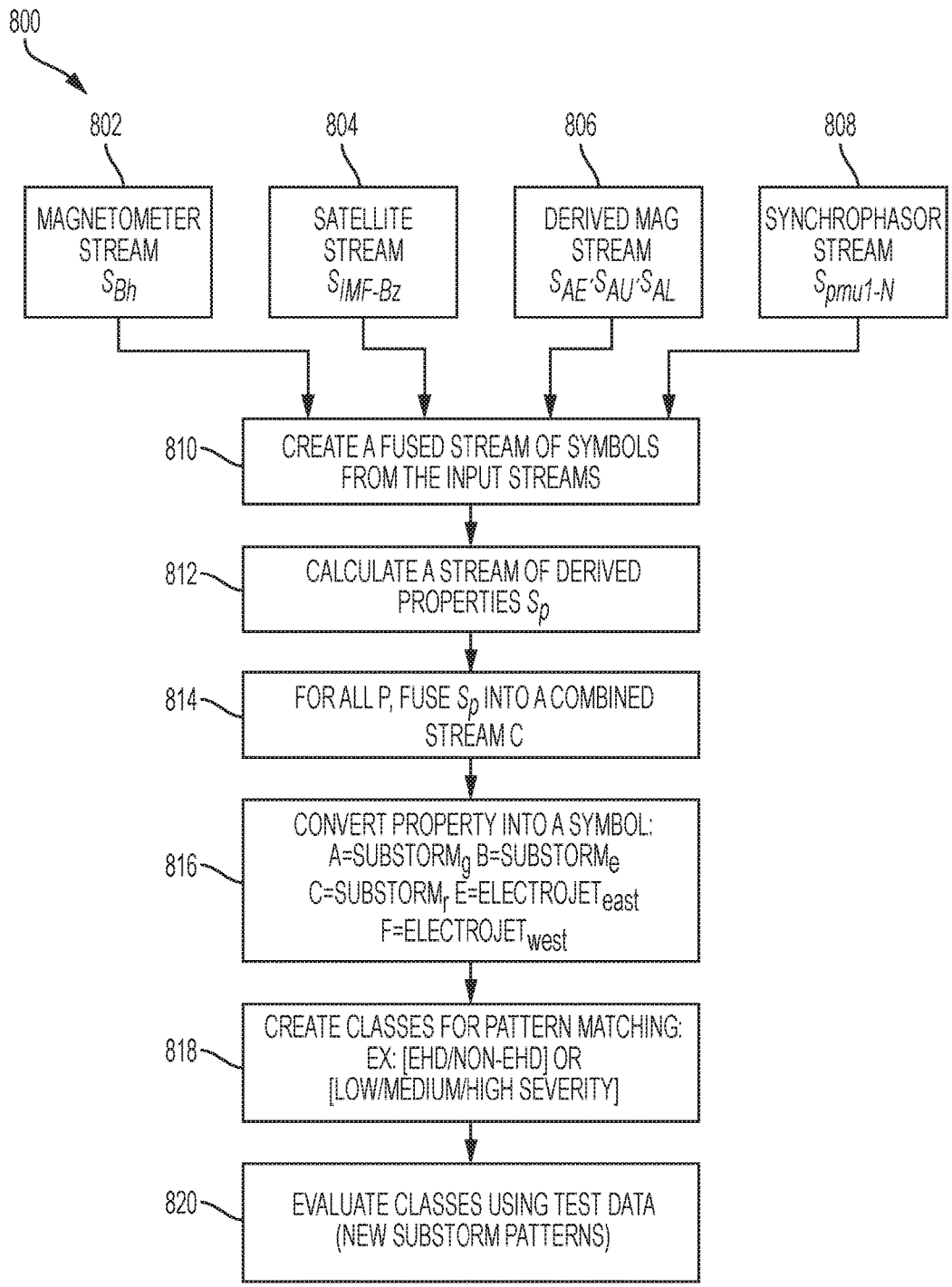
FIG. 10 depicts a flowchart for converting data streams into a fused stream of symbols to generate warnings according to one or more embodiments of the present invention.

FIG. 10 depicts a flowchart of a method 800 for applying a compression model to data streams according to one or more embodiments of the present invention. The method 800 includes four input data streams: a magnetometer stream $S_{Bh}$ 802, a satellite stream $S_{IMF-Bz}$ 804, a derived magnetometer stream $S_{AE}$, $S_{AU}$, $S_{AE}$ 806, and a synchrophasor stream $S_{pmu1-N}$ 808. Other data are possible and are not limited by these examples. One or more of the four data streams 802, 804, 806, 808 are used as inputs to block 810, where a fused stream of symbols is created from at least in part the input streams 802, 804, 806, 808. The method continues at block 812 where a stream of derived properties $S_p$ is calculated. The method continues with block 814, where, for all p, $S_p$ is fused into a combined stream C. At block 816, the method continues with converting properties into a symbol, including A=substorm$_g$, B=substorm$_e$, C=substorm$_e$, E=electrojet$_{east}$, and F=electrojet$_{west}$. Other properties are possible and are not limited by these examples. Once the properties are converted into symbols at block 816, block 818 continues with creating representative classes for pattern matching using a compression model. The steps for creating representative classes include 1) analyzing a time period before the event; 2) using $S_{AE}$ then start extracting the substorm sequence; 3) adding sequences to the compression model that represents the EHD class; and 4) repeating steps 1-3 to build a class representation for non-EHD events. In at least one embodiment, classes include EHD or non-EHD, and/or low/medium/high severity levels. The method continues with block 820, where classes are evaluated using test data to define new substorm patterns. Once a set of representative classes have been formed, the test data is evaluated to determine new substorm patterns. For each test harmonic event, consider a 24-hour time period (12 hours before and 12 hours after an event) and repeat the process in block 812 above, then compress every extracted $p_c$ and compute a compression ratio r. The next step is to compare similarity or r with respect to the average compression ratio of all extracted sequences in the EHD class. This process is repeated using all extracted sequences in the non-EHD class. Then, assign $p_c$ to a class with the maximum similarity. Next, filter criteria to edit candidate patterns for early warnings by ranking all $p_c$ by compression ratio and keep the top 50% for evaluation. This improves precision and recall, where precision is defined as the percentage of warnings that followed grid events during a set monitoring time, and recall is defined as the percentage of grid events that have had associated warnings ahead of time. Finally, a calculation is made to compute precision and recall to evaluate the results.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The corresponding structures, materials, acts, and equivalents of all means or step plus function elements in the claims below are intended to include any structure, material, or act for performing the function in combination with other claimed elements as specifically claimed. Embodiment of the present invention have been presented for purposes of illustration and description, but is not intended to be exhaustive or limited to the form described. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The flowchart and block diagrams in the figures illustrate the functionality and operation of possible implementations of systems and methods according to various embodiments of the present invention. In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. The actions can be performed in a differing order or actions can be added, deleted or modified. Also, the term "coupled" describes having a signal path between two elements and does not imply a direct connection between the elements with no intervening elements/connections therebetween. All of these variations are considered a part of the invention.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The terminology used herein is for describing particular embodiments only and is not intended to be limiting of embodiments of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While embodiments of the present invention have been described in detail in connection with only a limited number of embodiments, it should be readily understood that embodiments of the present invention are not limited to such described embodiments. Rather, embodiments of the present invention can be modified to incorporate any number of variations, alterations, substitutions or equivalent arrangements not heretofore described, but which are commensurate with the spirit and scope of the present invention. Additionally, while various embodiments of the present invention have been described, it is to be understood that aspects of the present invention can include only some of the described embodiments. Accordingly, the present invention is not to be seen as limited by the foregoing description, but is only limited by the scope of the appended claims.

What is claimed is:

1. A method comprising:
   receiving a substorm activity data log from one or more remote sensors, wherein substorm activity is due to solar activity;
   receiving a harmonic distortion data stream from one or more remote observatories monitoring disturbances on a power grid, wherein the distortion is due to geomagnetically induced currents;
   applying a mathematical model to the harmonic distortion data stream to create a derived harmonic distortion data log;
   computing the phase-to-phase similarity of a set of three electrical power phases from the derived harmonic distortion data log;

predicting future adverse events due to geomagnetically-induced currents on the power grid based at least in part on the phase-to-phase similarity and the substorm activity data log; and creating a warning based at least in part on the prediction.

2. The method of claim 1, wherein the harmonic distortion data stream is comprised of values of even harmonic distortion signals.

3. The method of claim 1, wherein the harmonic distortion data stream is comprised of values of odd harmonic distortion signals.

4. The method of claim 1, wherein the harmonic distortion data stream includes parameters of auroral electrojet, amplitude lower, and amplitude upper magnetic activity indices, wherein the indices are used to describe disturbances received by the remote observatories.

5. The method of claim 1, wherein the one or more remote sensors is a space-based satellite measuring mid-term and long-term interplanetary magnetic fields.

6. The method of claim 1, wherein the one or more remote observatories is a terrestrial monitoring station.

7. The method of claim 1, wherein the one or more remote observatories includes a magnetometer measuring near-term geomagnetic and geoelectric field data streams.

8. The method of claim 1, further comprising recording the results of the computing of phase-to-phase similarity values of the three electrical power phases from the derived harmonic distortion data log to create a classifier mathematical model for the prediction of substorm disturbances.

9. The method of claim 1, further comprising:
receiving spatial-temporal knowledge including parameters of auroral electrojet, amplitude lower, and amplitude upper magnetic activity indices, wherein the indices describe the disturbance level of substorm activity;
calculating a set of regional auroral electrojet, amplitude lower, and amplitude upper indexes, wherein the calculation uses a set of raw magnetic activity indices from superposed magnetograms collated from regional remote observatories;
calculating two or more regional auroral indices based at least in part on parameters including the set of regional auroral electrojet, amplitude lower, and amplitude upper indexes, the time or year, the position of an electrojet in relation to the earth, and the time of day;
comparing the regional auroral indices to a substorm model; and
predicting future adverse events based at least in part on the comparison.

10. The method of claim 9, further comprising computing substorm phases from the regional auroral electrojet and amplitude lower indexes, wherein the phase data is used to improve the accuracy of predicting adverse events.

11. The method of claim 9, wherein the substorm model includes, but is not limited to, a compression model or association rules.

12. The method of claim 9, wherein for each regional auroral index, an adjustment factor is mathematically added to account for locally-based parameters including time of day, local conditions, and latitude/longitude of the regional remote observatories.

13. The method of claim 11, wherein the compression model includes:
transforming a stream of raw and derived measurements from external sensors and observatories to auroral electrojet, amplitude lower, and amplitude upper indices;
analyzing a slope of variance for each regional amplitude lower indices;
comparing the slope of the regional amplitude lower indices to a mean-slope as a sign of critical transition and starting point of a substorm pattern;
storing the results of the comparison to form a slope variance log; and
applying compression techniques to the slope variance log to detect the beginning of a substorm event.

14. The method of claim 13 further comprising defining classes of substorms based at least in part on applying a compression model to the auroral electrojet, amplitude lower, and amplitude upper indices, wherein the classes include those substorms that impact the power grid and those substorms that do not impact the power grid.

15. A method, comprising:
receiving a log of geomagnetic variation measurements from one or more remote observatories;
calculating a geomagnetic variation reference value for each month for each remote observatory;
calculating the difference between the geomagnetic variation reference value and the current geomagnetic variation measurements;
determining auroral magnetic activity indices based at least in part on superposing the differences from each observatory to determine an amplitude upper envelope and an amplitude lower envelope, and wherein an auroral electrojet index is given as equaling an amplitude upper index minus an amplitude lower index; and
applying the auroral magnetic activity indices to generate a warning in response to substorm activity.

16. A system, comprising:
a memory having computer readable instructions;
a processor for executing the computer readable instructions, the computer readable instructions including:
receiving a substorm activity data log from one or more remote sensors, wherein substorm activity is due to solar activity;
receiving a harmonic distortion data stream from one or more remote observatories monitoring disturbances on a power grid, wherein the distortion is due to geomagnetically induced currents;
applying a mathematical model to the harmonic distortion data stream to create a derived harmonic distortion data log;
computing phase-to-phase similarity of the three phases from the derived harmonic distortion data log;
predicting future adverse events due to geomagnetically induced currents on the power grid based at least in part on the comparison and the substorm activity data log; and
creating a warning based on the prediction.

17. The system of claim 16, wherein the one or more remote sensors is a space-based satellite measuring mid-term and long-term interplanetary magnetic fields.

18. The method of claim 16, wherein the one or more remote observatories is one or more terrestrial monitoring stations.

19. The system of claim 16, wherein the one or more remote observatories is a magnetometer measuring near-term geomagnetic and geoelectric field data streams.

20. The system of claim 16, wherein the substorm activity includes parameters of solar wind speed, magnetic fields, temperature, and proton density.

* * * * *